United States Patent
Walsh

(10) Patent No.: US 9,405,923 B2
(45) Date of Patent: Aug. 2, 2016

(54) ESTABLISHING ISOLATION BETWEEN CONTENT HOSTING SERVICES EXECUTING ON COMMON SUPPORT SERVER

(75) Inventor: Daniel J. Walsh, Marlborough, MA (US)

(73) Assignee: Red Hat, Inc., Raleigh, NC (US)

( * ) Notice: Subject to any disclaimer, the term of this patent is extended or adjusted under 35 U.S.C. 154(b) by 200 days.

(21) Appl. No.: 13/248,797

(22) Filed: Sep. 29, 2011

(65) Prior Publication Data

US 2013/0086623 A1  Apr. 4, 2013

(51) Int. Cl.
*G06F 17/00* (2006.01)
*G06F 21/62* (2013.01)

(52) U.S. Cl.
CPC .................................. *G06F 21/6218* (2013.01)

(58) Field of Classification Search
CPC ....... H04L 63/20; H04L 63/102; H04L 63/08; G06F 21/6218; G06F 21/31
USPC .................................................. 726/1, 2, 27
See application file for complete search history.

(56) References Cited

U.S. PATENT DOCUMENTS

| | | | | |
|---|---|---|---|---|
| 7,134,022 B2* | 11/2006 | Flyntz | ............................. | 713/182 |
| 7,379,947 B2* | 5/2008 | McSherry | | |
| 7,437,556 B2* | 10/2008 | Tucker et al. | .................. | 713/164 |
| 7,882,227 B2* | 2/2011 | Faden | ............................ | 709/225 |
| 7,886,038 B2* | 2/2011 | Ferris | ............................. | 709/223 |
| 2004/0015701 A1* | 1/2004 | Flyntz | ............................. | 713/182 |
| 2010/0132011 A1* | 5/2010 | Morris et al. | ...................... | 726/1 |

* cited by examiner

*Primary Examiner* — Ali Abyaneh
(74) *Attorney, Agent, or Firm* — Lowenstein Sandler LLP

(57) ABSTRACT

Embodiments relate to systems and methods for establishing isolation between content hosting services executing on a common support server. In aspects, a server virtualization platform can operate on a common physical support server to instantiate, configure, and operate a set of virtual servers. The set of virtual servers can, for instance, be used to run independent Web sites or other locations or services. The data available to each process on each virtual server can be encoded using an SELinux™ label including an MCS (multi-category security) category or categories uniquely identifying that process. Isolation of the potentially sensitive data for multiple Web sites and/or their content hosted on a common physical server can therefore be enforced, since each process operating on each virtual server is restricted to only access and manipulate data objects or other entities having matching MCS category information identified on that baremetal support server.

18 Claims, 4 Drawing Sheets

| SECURITY POLICY 108 | | |
|---|---|---|
| PROCESS 118 | LABEL 120 | MATCHED LABEL OBJECTS 122 |
| 1A | VS1: 1A | FILE 240: 33 |
| | | FILE 327: 46 |
| | | DIR USER 1,2,3 |
| | | ⋮ |
| | | PORT 262 |
| | | |
| 1B | VS1: 1B | FILE 623: 29 |
| | | FILE 849: 15 |
| | | PORT 113 |
| | | ⋮ |
| | | SERVICE AUTHENT A3A |
| | | |
| MZ | VS1: MZ | SERVICE USERID 410 |
| | | PORT 209 |
| | | FILE 10F8: 58 |
| | | ⋮ |
| | | DIR CORPORATE_ROOT |

FIG. 2

ESTABLISHING ISOLATION BETWEEN CONTENT HOSTING SERVICES EXECUTING ON COMMON SUPPORT SERVER

FIELD

The present teachings relate to systems and methods for establishing isolation between content hosting services executing on a common support server, and more particularly to platforms and techniques for establishing and enforcing isolation between data used by different virtual Web servers or other servers, but operating on a common physical support server.

BACKGROUND

The trend toward the virtualization of online applications, services, and other resources has extended to the virtualization of various types of Web servers. Using known products and services, today it is possible for a Web site, such as the Web site for a restaurant or music download store, to be hosted on a virtualized Web server. That is, it is possible for a number of virtual Web servers to be established and deployed to serve data and service visitors to various Web outlets, while those virtual Web servers may be hosted on one physical machine.

In the case of operating a number of Web sites or other services based on virtual Web servers which are co-hosted on a single physical or baremetal server, or a cluster of the same, the issue can arise that multiple processes can store diverse pieces of sensitive data on the same physical drive or other medium attached to that physical server. One application or process executing on one virtual server could then, potentially, achieve access to the data of another process on that virtual server or another virtual server instantiated and running on that same underlying physical support server or other hardware.

It may be desirable to provide methods and systems for establishing isolation between content hosting services executing on a common support server, in which data isolation and protection can be enforced between applications or other processes executing on a common support server, using a common data file labeling or categorization scheme which prevents unauthorized access by simultaneously executing processes to data stored on the common support server.

DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 2 illustrates a schematic diagram of a security policy that can be used in systems and methods for establishing isolation between content hosting services executing on a common support server, according to various embodiments;

DESCRIPTION OF EMBODIMENTS

Embodiments of the present teachings relate to systems and methods for establishing isolation between content hosting services executing on a common support server. More particularly, aspects of the present teachings relate to platforms and techniques for configuring a common physical server platform used to support a set of virtual servers so that data commonly stored on the hardware platform remain appropriately isolated between processes executing on the virtual servers. In aspects, each virtual server and/or each application or process executing on each virtual server can be assigned a uniform security label, such as a non-hierarchical categorization of that virtual server/process. Objects or resources such as files, directories, services, ports, and/or others that are hosted by and used by the respective processes can then be assigned a matching label and/or category in a security policy, such as a category assigned under the multi-category security (MCS) scheme of the SELinux™ environment. Once a unique label/category and associated data having a matching label/category is generated. only an application or other process having a matching label and/or category can be permitted to access to that data, alter that data, and/or perform other actions on that data. These and other embodiments described herein address the various noted shortcomings in known server virtualization technology, and provide a user or network operator with an enhanced ability to structure and enforce data management policies for the collection of data stored on a common physical server or cluster which supports a diverse set of virtual servers and stores their associated data.

Reference will now be made in detail to exemplary embodiments of the present teachings, which are illustrated in the accompanying drawings. Where possible the same reference numbers will be used throughout the drawings to refer to the same or like parts.

Figure 1:
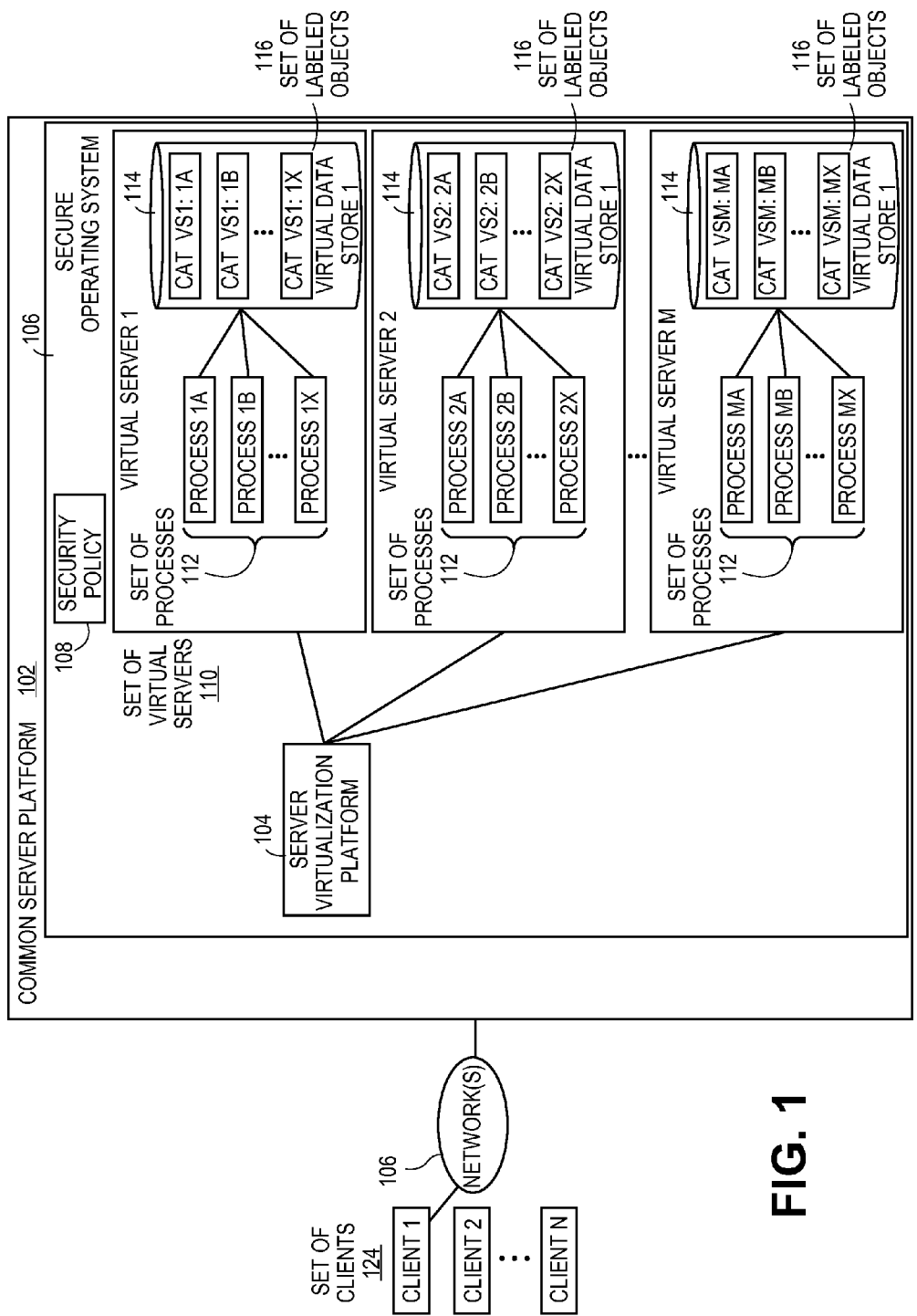
FIG. 1 illustrates an overall network that can be used in systems and methods for establishing isolation between content hosting services executing on a common support server, according to various embodiments.

FIG. 1 illustrates an overall network in which a common server platform 102 can operate to support a set of virtual servers 110 with hardware, software, and/or other resources using a server virtualization platform 104. In aspects, the common server platform 102 can be or include any known physical server system, platform, or hardware, including processor, memory, storage, communication, and/or other resources. In aspects, the common server platform 102 can also or instead be or include a cluster or set of physical server machines, whether of similar or diverse types. In aspects, the server virtualization platform 104 can be or include the Libra™ platform available from Libra Software GmBH, Mannheim, Germany, or other server virtualization platforms or systems. In general, the server virtualization platform 104 can instantiate, configure, and manage the set of virtual servers 110, each of which can instantiate and execute one or more application or other process in a set of processes 112 operating on each respective virtual server. In aspects, the server virtualization platform 104 and/or other logic, application, and/or service can also invoke or interface to cloud-based networks to support the set of virtual servers 110 and to perform other activities.

According to aspects, each of the servers in the set of virtual servers 110 can be or include Web servers or platforms of known types, such as, merely for instance, one or more Apache™-based Web servers or platforms. The set of processes 112 can be or include any type of application, service, thread, and/or process. The set of processes 112 can, for example, be or include a Web site and/or Web service, and/or any supporting application or service, delivered to one or more of a set of clients 124 via one or more networks 106, such as the public Internet and/or other public or private networks. In implementations, one or more of the servers in the set of virtual servers 110 can operate using a secure operating system environment, such as the SELinux™ operating system distribution, or others.

According to aspects in further regards, the server virtualization platform 104 and/or other logic, application, and/or service can access and maintain a security policy 108 to manage access to data stored in local storage 114, such as hard disk, electronic memory, and/or other storage, that is maintained by the common server platform 102 for the use of the set of processes 112 and/or other applications or services. According to aspects, the data stored in the local storage 114 can be or include a set of labeled objects 116, which can include a variety of data objects and/or other entities. The set of labeled objects 116 can, for example, be or include files, directories, tables, databases, ports, services, and/or other data structures, objects, and/or other resources. In general, each process in the set of processes 112 can have one or more associated objects in the set of labeled objects 116 to which that process has access, modification, and/or other privileges while other processes in the set of processes 112 are restricted from those privileges. According to aspects, the server virtualization platform 104 and/or other logic, application, and/or service can, in general, isolate the various data objects and/or other entities in the set of labeled objects 116 by assigning unique labels and/or categories to each process in the set of processes 112, and providing or associating a matching label/category to the data objects and/or other entities used or accessed by that process, in mutually exclusive fashion.

Thus, and for instance as further shown in FIG. 2, the server virtualization platform 104 and/or other logic, application, and/or service can maintain information within the security policy 108 reflecting the assigned label for each process and the data objects or other objects or entities having a matching a corresponding label, category, and/or other identifier or attribute. The security policy 108 can thereby incorporate a set of process identifiers 118 for each of the set of processes 112, as well as a set of labels 130, such as SELinux™ labels, which correspond to each process. In aspects, the set of labels 130 can include categories, such as a category "VS1" to reflect that a process is executing or hosted on virtual server 1, and category "1A" to identify process 1A operating or executing on that virtual server. In aspects, for each process and label, the security policy 108 can likewise reflect all files, directories, services, ports, and/or other objects or entities in the set of matched label objects 122 which contain matching labels and/or categories, indicating that those data objects and/or other objects or entities may be accessed and/or manipulated by that identified process, but not others supported by the common support platform 102.

Thus, merely for instance, if Process 1 represents the Web site or Web service for a bank or other financial institution (Bank 1), and Process 2 represents the Web site or Web service for another bank or other financial institution and/or other entity (Bank 2), then the Web site or Web service for Bank 1 can access, serve, and/or otherwise use or manipulate all files, directories, and/or other entities for its customers or other users in the set of clients 124, while the Web site or Web service for Bank 2 can access, server, and/or otherwise use or manipulate all files, directories, and/or other entities for its customers or other users in the set of clients 124. By restricting or controlling data availability in the local storage 114 to only those processes having a matching label and/or category, the data for Process 1 (and its users) and the data for Process 2 can remain isolated from mutual access or intrusion, even while those processes and others are hosted on the set common server platform 102 via the server virtualization platform 104. It may be noted that in implementations, each server in the set of virtual servers 110 can be configured to host just one process rather than multiple processes in the set of processes 112, thereby creating a one-to-one relationship between virtual servers and individual processes, if desired.

Figure 3:
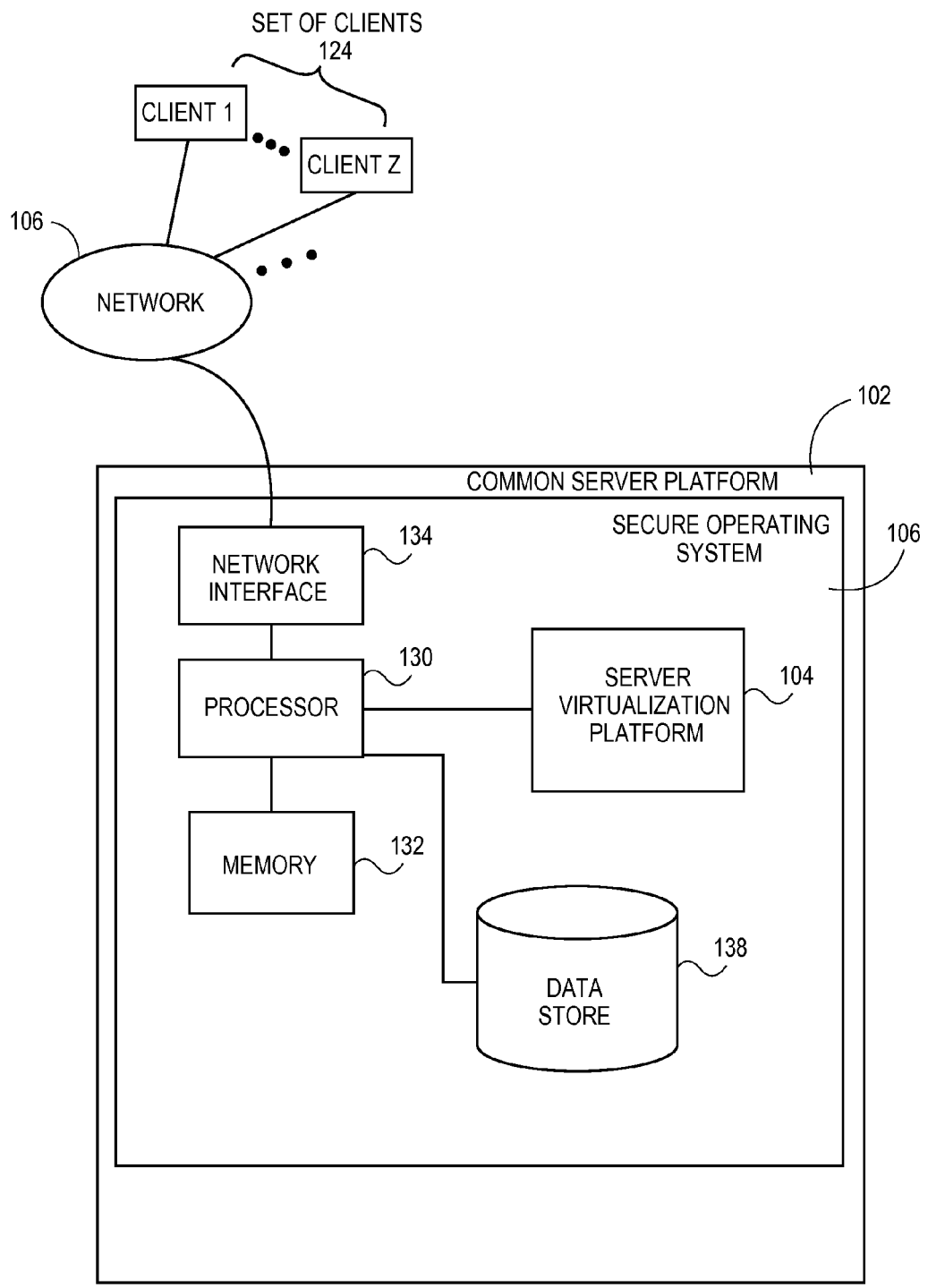
FIG. 3 illustrates an exemplary hardware diagram of a common server platform that can support one or more sets of virtual servers, according to various embodiments.

FIG. 3 illustrates an exemplary hardware diagram of a common server platform 102, that can be used in systems and methods for establishing isolation between content hosting services executing on common support server. In implementations as shown, common server platform 102 can comprise a processor 130 communicating with memory 132, such as electronic random access memory, operating under control of or in conjunction with a secure operating system 106. The secure operating system 106 can be, for example, a distribution of the SELinux™ operating system, or other open-source or proprietary operating system or platform. The processor 130 also communicates with a data store 138, such as a database stored on a local hard drive, and a server virtualization platform 104, to execute control logic and control the operation of the set of virtual servers 110, including the serving of data, content, and/or services to the set of clients 124. The processor 130 can further communicate with a network interface 134, such as an Ethernet or wireless data connection, which in turn communicates with the one or more networks 106, such as the Internet or other public or private networks. Other configurations of the common server platform 102, associated network connections, and other hardware, software, and service resources are possible. It may be noted that in embodiments, the set of clients 124 and/or other hardware machines, platforms, or engines can comprise the same or similar resources as the common server platform 102, or can be configured with different hardware and software resources.

Figure 4:
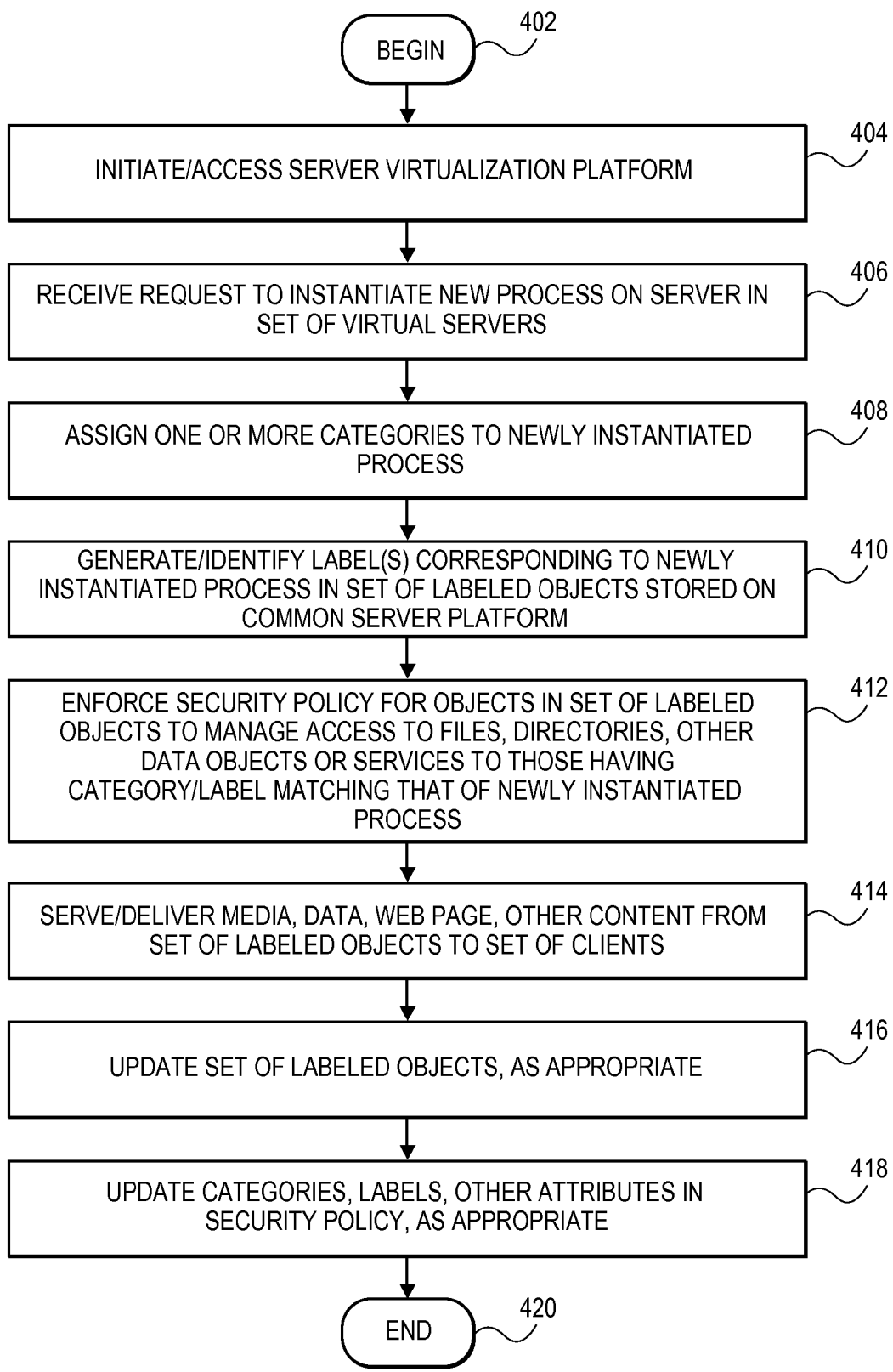
FIG. 4 illustrates a flowchart of processing for the labeling, categorization, and management of data access for data objects store on a common server platforms in systems and methods for establishing isolation between content hosting services executing on a common support server, according to various embodiments.

FIG. 4 illustrates a flowchart of process management, data labeling and categorization, and other processing that can be used to support or implement systems and methods for establishing isolation between content hosting services executing on common support server, according to aspects. In 402, processing can begin. In 404, the server virtualization platform 104 can be initiated and/or accessed, for instance, by a systems administrator or other user. In 406, the server virtualization platform 104 can receive a request to instantiate a new process on a virtual server in the set of virtual servers 110. The request can for instance be received from the operator of a Web site to instantiate a new process related to serving data or providing services via a Web site, and/or from other administrators or users. In 408, the server virtualization platform 104 and/or other logic, application, and/or service can assign one or more categories to the newly instantiated process. For instance, the server virtualization platform 104 can assign the categories of "public Web site," "Restaurant ID 62," "Daily Menu Data," and "Virtual Server Number 122" to the newly instantiated process, and/or can assign or apply other categories to the newly instantiated process. In implementations, each server in the set of virtual servers 110 can be configured to host just one process, and that process and/or server can be randomly assigned or otherwise assigned a unique category. In aspects, the category or categories assigned to the newly instantiated process can be encoded in the label assigned to the process adhering to the multi-category security (MCS) scheme of SELinux™.

In 410, the server virtualization platform 104 and/or other logic, application, and/or service can generate, access, look up, and/or identify a label or labels corresponding to the label of the newly instantiated process in the set of labeled objects 116 stored on the common server platform 102. That is, the server virtualization platform 104 and/or other logic, application, and/or service can located, identify, and/or store data objects and/or other objects or entities, such as services, communications ports, or other resources, which are exclusively associated with the newly instantiated process as identified by its category/label. In 412, the server virtualization platform 104 and/or other logic, application, and/or service can enforce the security policy 108 for objects or entities in the set of labeled objects 116 to manage access to files, directories, ports, services, and/or other data objects, services, and/or resources to restrict, limit, or regulate access to those objects, entities, or resources having a label/category matching that of the newly instantiated process. Thus, for instance, a Web site and associated data store may contain a confidential list of all patients of a medical practice, and only permit access to that list or related records based on that process (or processes) having a label, category, or categories matching the label/category of the data file containing that patient list. In 414, the server virtualization platform 104 and/or other logic, application, and/or service can serve and/or deliver the media, data, Web page, and/or other content, service, or resources from the set of labeled objects 116 to the set of clients 124 wishing to access that content or other resources from the corresponding Web site process in the set of processes 112. In 416, the server virtualization platform 104 and/or other logic, application, and/or service can update the set of labeled objects 116, as appropriate, for instance to add, modify, and/or delete data. In 418, the server virtualization platform 104 and/or other logic, application, and/or service can update the set of processes 118, set of labels 120, the set of categories used by the set of processes 118, the set of matched label objects 122, other components or records of the security policy 108, and/or other information, as appropriate. In 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which one common support server 102 supports the set of virtual servers 110, in embodiments, as noted, multiple servers and/or clusters of servers or other resources can be used to support the set of virtual servers 110 or other entities. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    receiving a request to instantiate a first process of a first set of processes via a server virtualization platform hosting a plurality of virtual servers supported by a common support server, wherein each of the plurality of virtual servers executes a respective set of processes;
    generating a plurality of security categories;
    assigning the plurality of security categories to the first process;
    assigning the plurality of security categories to an object in a set of labeled objects stored on the common support server; and
    enforcing, by a hardware processor, a security policy to prevent access to data associated with the object stored on the common support server by a second process supported by the common support server, wherein enforcing the security policy comprises comparing the plurality of security categories assigned to the object to a security category assigned to the second process to exclude access when the security category assigned to the second process does not match at least one of the plurality of security categories assigned to the object.

2. The method of claim 1, wherein at least one of the plurality of security categories comprises a multi-category security (MCS) category.

3. The method of claim 1, wherein the set of labeled objects comprises at least one of a data file, a directory, a port, or a service.

4. The method of claim 1, wherein the first process comprises a Web site or a Web service.

5. The method of claim 4, wherein the Web site or Web service is served to a set of clients.

6. The method of claim 1, wherein assigning the plurality of security categories comprises randomly assigning at least a portion of the plurality of security categories.

7. The method of claim 1, wherein each server in the plurality of virtual servers hosts one process.

8. The method of claim 1, wherein the at least one of the plurality of security categories is encoded in a security label.

9. A system comprising:
    a data store on a common support server; and
    a hardware processor of the common support server, the hardware processor operatively coupled to the data store, the hardware processor to:
        receive a request to instantiate a first process of a first set of processes via a server virtualization platform hosting a plurality of virtual servers supported by a common support server, wherein each of the plurality of virtual servers executes a respective set of processes,
        generate a plurality of security categories;
        assign the plurality of security categories to the first process;
        assign the plurality of security categories to an object in a set of labeled objects stored on the common support server, and
        enforce a security policy to prevent access to data associated with the object stored on the common support server by a second process supported by the common support server, wherein enforcing the security policy comprises comparing the plurality of security categories assigned to the object to a security category assigned to the second process to exclude access when the security category assigned to the second process does not match at least one of the plurality of security categories assigned to the object.

10. The system of claim 9, wherein at least one of the plurality of security categories comprises a multi-category security (MCS) category.

11. The system of claim 9, wherein the set of labeled objects comprises at least one of a data file, a directory, a port, or a service.

12. The system of claim 9, wherein the first process comprises a Web site or a Web service.

13. The system of claim 12, wherein the Web site or Web service is served to a set of clients.

14. The system of claim 9, wherein assigning the plurality of security categories comprises randomly assigning at least a portion of the plurality of security categories.

15. The system of claim 9, wherein each server in the plurality of virtual servers hosts one process.

16. The system of claim 9, wherein the at least one of the plurality of security categories is encoded in a security label.

17. A non-transitory computer readable storage medium including instructions that, when executed by a hardware processor, cause the hardware processor to:
- receive a request to instantiate a first process of a first set of processes via a server virtualization platform hosting a plurality of virtual servers supported by a common support server, wherein each of the plurality of virtual servers executes a respective set of processes;
- generate a plurality of security categories;
- assign the plurality of security categories to the first process;
- assign the plurality of security categories to an object in a set of labeled objects stored on the common support server; and
- enforce, by the hardware processor, a security policy to prevent access to data associated with the object stored on the common support server by a second process supported by the common support server, wherein enforcing the security policy comprises comparing the plurality of security categories assigned to the object to a security category assigned to the second process to exclude access when the security category assigned to the second process does not match at least one of the plurality of security categories assigned to the object.

18. The non-transitory computer readable storage medium of claim 17, wherein at least a portion of the plurality of security categories are randomly assigned to the first process and the object.

\* \* \* \* \*